United States Patent
Pavia et al.

(10) Patent No.: US 8,826,975 B2
(45) Date of Patent: Sep. 9, 2014

(54) SYSTEMS AND METHODS OF MICROBIAL ENHANCED OIL RECOVERY

(75) Inventors: Michael Raymond Pavia, Durham, NC (US); Thomas Ishoey, Houston, TX (US); Stuart Mark Page, Houston, TX (US); Egil Sunde, Sandnes (NO)

(73) Assignee: Glori Energy Inc., Houston, TX (US)

( * ) Notice: Subject to any disclaimer, the term of this patent is extended or adjusted under 35 U.S.C. 154(b) by 363 days.

(21) Appl. No.: 13/085,308

(22) Filed: Apr. 12, 2011

(65) Prior Publication Data
US 2012/0261117 A1 Oct. 18, 2012

(51) Int. Cl.
 E21B 43/22 (2006.01)
 E21B 43/16 (2006.01)
 C09K 8/582 (2006.01)
(52) U.S. Cl.
 CPC .......... E21B 43/16 (2013.01); C09K 8/582 (2013.01)
 USPC .......................................... 166/246; 166/270
(58) Field of Classification Search
 None
 See application file for complete search history.

(56) References Cited

U.S. PATENT DOCUMENTS

| | | | |
|---|---|---|---|
| 2,907,389 A * | 10/1959 | Hitzman | 299/17 |
| 3,332,487 A | 7/1967 | Jones | |
| 4,286,660 A | 9/1981 | Wagner et al. | |
| 4,446,919 A | 5/1984 | Hitzman | |
| 4,450,908 A | 5/1984 | Hitzman | |
| 4,475,590 A | 10/1984 | Brown | |
| 4,558,739 A | 12/1985 | McInerney et al. | |
| 4,640,767 A | 2/1987 | Zajic et al. | |
| 4,659,463 A | 4/1987 | Chandler et al. | |
| 4,678,033 A | 7/1987 | Killough | |
| 4,799,545 A | 1/1989 | Silver et al. | |
| 4,905,761 A | 3/1990 | Bryant | |
| 4,906,575 A | 3/1990 | Silver et al. | |
| 4,947,932 A | 8/1990 | Silver et al. | |
| 4,971,151 A | 11/1990 | Sheehy | |
| 5,083,610 A * | 1/1992 | Sheehy | 166/246 |
| 5,083,611 A | 1/1992 | Clark et al. | |
| 5,143,155 A | 9/1992 | Ferris et al. | |
| 5,163,510 A * | 11/1992 | Sunde | 166/246 |
| 5,297,625 A | 3/1994 | Premuzic et al. | |
| 5,327,967 A | 7/1994 | Jenneman et al. | |
| 5,341,875 A | 8/1994 | Jenneman et al. | |

(Continued)

FOREIGN PATENT DOCUMENTS

CN 201043460 5/2007
CN 101988380 8/2010

(Continued)

OTHER PUBLICATIONS

Todar; *Pseudomonas aeruginosa*; http://textbookofbacteriology.net/pseudomonas.html; pp. 1-4.*

(Continued)

Primary Examiner — Angela M DiTrani
Assistant Examiner — Anuradha Ahuja
(74) Attorney, Agent, or Firm — Fulbright & Jaworski LLP

(57) ABSTRACT

A method of microbial enhanced oil recovery from an oil-bearing formation that involves treating the water that is to be injected into the oil-bearing formation to enable microbial activity and adding oxygen to aid microbial activity. The treatment applied to the water is based, at least in part, upon establishing at least one condition in the oil-bearing formation favorable to microbial activity that enhances movement of oil from the oil-bearing formation.

30 Claims, 3 Drawing Sheets

(56) References Cited

U.S. PATENT DOCUMENTS

| | | | |
|---|---|---|---|
| 5,360,064 A | 11/1994 | Jenneman et al. | |
| 5,363,913 A | 11/1994 | Jenneman et al. | |
| 5,368,099 A | 11/1994 | Davey et al. | |
| 5,492,828 A | 2/1996 | Premuzic et al. | |
| 5,858,766 A | 1/1999 | Premuzic et al. | |
| 6,543,535 B2 | 4/2003 | Converse et al. | |
| 6,546,962 B1* | 4/2003 | Sunde | 137/893 |
| 6,758,270 B1* | 7/2004 | Sunde et al. | 166/246 |
| 6,905,870 B2 | 6/2005 | Brown et al. | |
| 7,124,817 B1 | 10/2006 | Sunde | |
| 7,244,693 B2 | 7/2007 | Kotlar et al. | |
| 7,270,184 B2 | 9/2007 | Kotlar et al. | |
| 7,325,603 B2 | 2/2008 | Kotlar et al. | |
| 7,341,979 B2 | 3/2008 | Kotlar et al. | |
| 7,407,583 B2 | 8/2008 | Mailath et al. | |
| 7,416,879 B2 | 8/2008 | Pfeiffer et al. | |
| 7,426,960 B2 | 9/2008 | Pfeiffer et al. | |
| 7,464,760 B2 | 12/2008 | McElhiney | |
| 7,472,747 B1 | 1/2009 | Brigmon et al. | |
| 7,484,560 B2 | 2/2009 | Lal et al. | |
| 7,681,638 B2 | 3/2010 | Soni et al. | |
| 2001/0045279 A1* | 11/2001 | Converse et al. | 166/246 |
| 2004/0244969 A1 | 12/2004 | Kotlar et al. | |
| 2007/0092930 A1 | 4/2007 | Lal et al. | |
| 2007/0215344 A1 | 9/2007 | McElhiney | |
| 2008/0289816 A1* | 11/2008 | Pfeiffer et al. | 166/246 |
| 2009/0029879 A1 | 1/2009 | Soni et al. | |
| 2010/0044031 A1 | 2/2010 | Fallon et al. | |
| 2010/0218946 A1 | 9/2010 | Symington | |
| 2011/0061858 A1 | 3/2011 | Ward | |
| 2011/0067856 A1 | 3/2011 | Kohr | |
| 2012/0273189 A1 | 11/2012 | Alsop et al. | |

FOREIGN PATENT DOCUMENTS

| | | |
|---|---|---|
| WO | WO-92/13172 | 8/1992 |
| WO | WO-01/33040 | 5/2001 |
| WO | WO-2011050509 | 5/2011 |

OTHER PUBLICATIONS

Ramkrishna Sen, "Biotechnology in petroleum recovery: the microbial EOR," Jun. 20, 2008, pp. 714-724.

L. R. Brown et al., "Slowing Production Decline and Extending the Economic Life of an Oil Field: New MEOR Technology," Apr. 2000, pp. 1-16.

Sunde et al., "Aerobic Microbial Enhanced Oil Recovery for Offshore Use," SPE/DOE Eighth Symposium on Enhanced Oil Recovery, Tulsa, OK Apr. 22-24, 1992, SPE/DOE 24204, Society of Petroleum Engineers Inc., pp. 497-502.

Sharma et al., "Microbial Enhanced Oil Recovery Research," Final Report, Annex V, Prepared for U.S. Department of Energy, Contract No. DE-FG07-89BC14445, Jul. 1993, 142 pages.

Al-Blehed et al., "Laboratory Investigation of Microbial Enhanced Oil Recovery", J. King Saud Univ., vol. 8, Eng. Sci. (2), Jun. 21, 1995, pp. 165-186.

Bryant et al., "Biotechnology for Heavy Oil Recovery", BDM Petroleum Technology, No. 1998.110, 1998, pp. 1-7.

Jennings et al., "Biosurfactant-Producing Bacteria Found in Contaminated and Uncontaminated Soils", Proceedings of the 2000 Conference on Hazardous Waste Research, 2000, pp. 299-306.

Illias et al., "Isolation and Characterization of Halotolerant Aerobic Bacteria From Oil Reservoir", Jurnal Teknologi, 35(C) Dis. 2001: 1-10, 2001, pp. 1-9.

Kowalewski et al., "Analyzing Microbial Improved Oil Recovery Processes From Core Floods", SC2005-49, International Symposium of the Society of Core Analysis, Aug. 2005, pp. 1-12.

Sepahy et al., "Production of Biosurfactant From Iranian Oil Fields by Isolated Bacilli", International Journal of Environmental Science & Technology, vol. 1, No. 4, Winter 2005, pp. 287-293.

Ghojavand, "Enhanced Oil Recovery Using Microbial Surfactant Flooding", Abstract of Dissertation, Amirkabir University of Technology, dated 2008.

Marshall et al., "Fundamental Aspects of Microbial Enhanced Oil Recovery: A Literature Survey", National Research Flagships Wealth From Oceans, Mar. 2008, pp. 1-41.

Youssef et al., "Microbial Processes in Oil Fields: Culprits, Problems, and Opportunities", Advances in Applied Microbiology, vol. 66; Burlington Academic Press, 2009, Chapter 6, pp. 141-251.

Brown, "Microbial Enhanced Oil Recovery (MEOR)", Current Opinion in Microbiology (2010), Jan. 11, 2010, pp. 1-5.

International Search Report and Written Opinion issued for PCT/US2012/025175, dated May 31, 2012, 7 pages.

U.S. Appl. No. 13/504,947, Bozhong et al.

* cited by examiner

SYSTEMS AND METHODS OF MICROBIAL ENHANCED OIL RECOVERY

TECHNICAL FIELD

The current invention generally relates to the field of enhanced oil recovery (EOR). Specifically, the current invention relates to systems and methods of microbial enhanced oil recovery.

BACKGROUND OF THE INVENTION

Petroleum (crude oil) is one of the world's major sources of energy. Crude oil naturally occurs in geological formations. Typically, the crude oil is recovered by simply drilling a well in an oil-bearing formation. For some wells, because the oil is under pressure in the reservoir, the oil rises to the surface unaided and recovery simply involves constructing pipelines to carry the crude oil to storage facilities such as tanks. This is known as primary recovery. Over the life of a well, however, the reservoir pressure falls and eventually becomes insufficient to cause the oil to rise to the surface. In this scenario, additional measures have to be adopted to get the oil to the surface. These additional methods are known as secondary recovery methods. Secondary oil recovery includes: pumping, water injection, natural gas reinjection, and gas lift (air injection, carbon dioxide injection or injection of other gases into the production well).

The primary and secondary oil recovery methods noted above usually do not result in all the oil in a formation being recovered. Indeed, it is estimated that about half to two-thirds of the oil of a formation remains in that formation after primary and secondary oil recovery. To leave that much oil—a finite resource—in each formation is undesirable. Consequently, over time, further methods have been developed to increase the proportion of oil recovered from a formation after primary and secondary methods fail to provide adequate oil production. These methods are known as tertiary or enhanced oil recovery methods. Common enhanced oil recovery methods include thermal enhanced oil recovery such as steam injection and in-situ burning, chemical flooding methods such as polymer flooding, surfactant flooding, alkaline flooding, micellar flooding and alkaline-surfactant-polymer flooding. However, in situ-combustion is hard to control, steam injection requires expensive steam generating equipment, and chemical flooding is often uneconomical because of the cost of the chemicals. Microbial enhanced oil recovery (MEOR) can be used as a secondary or tertiary enhanced oil recovery process that offers an alternative EOR method that is expected to be less costly and potentially more effective than other EOR methods.

MEOR involves the use of biological organisms—microbes—growing in-situ in a formation to facilitate either the production of materials to aid oil recovery or implementing a mechanism for oil recovery. MEOR has been in existence for at least 50 years and is believed to enhance oil recovery in one of or a combination of several ways. First, the microbes produce surfactants in the formation. Surfactants are wetting agents that lower the interfacial tension between fluids and/or substances. Thus, surfactants produced by microbes reduce the interfacial tension of oil droplets that would prevent the oil from moving easily through the formation. Second, the microbes can produce gases such as methane, carbon dioxide, nitrogen and hydrogen. The production of these gases can increase the pressure in the formation and reduce oil viscosity, which makes it easier to mobilize the oil (to the surface). Third, the microbes can also produce compounds, such as acids, that dissolve carbonates and make the formation more permeable so that oil will flow easily thorough the formation to the surface. Fourth, other compounds (solvents) produced by the microbes may decrease the viscosity of the oil so that it flows easier through the formation. Fifth, the microbes break down the hydrocarbons in the oil, making the oil less viscous and easier to recover. Sixth, the microbes may be used to plug certain sections of an oil-bearing formation as a method of modifying fluid flow. These are only some of the ways MEOR is believed to enhance oil recovery.

Microbial processes in the reservoir primarily involve anaerobic microbes, in part, because it is typical that oxygen content is low in oil-bearing formations. Nonetheless, aerobic MEOR is also practiced as is described, for example, in U.S. Pat. No. 5,163,510 entitled, "Method of Microbial Enhanced Oil Recovery," the disclosure of which is incorporated herein in its entirety by reference. While historically there has been some success with MEOR generally, positive results are not consistent and it may be concluded that MEOR's impact overall, to date, is marginal with regards to the improvement in the proportion of oil recovered from formations. Therefore, there exists a need to make MEOR a more successful method of enhancing oil recovery.

BRIEF SUMMARY OF THE INVENTION

The current invention is directed to systems and methods of microbial enhanced oil recovery that involves adapting the environment in which microbes live in an oil-bearing formation. The adaptations of the environment facilitate microbial activity that increases oil recovery from the oil-bearing formation.

Certain embodiments of the invention include a method that involves introducing microbes into an oil-bearing formation. The method further includes treating water that is to be injected into the oil-bearing formation. The treatment applied to the water is based, at least in part, upon establishing at least one condition in the oil-bearing formation favorable to microbial activity that enhances movement of oil from the oil-bearing formation. The treated water is injected in the oil-bearing formation to establish the condition. Embodiments of the invention also include introducing oxygen into the oil-bearing formation.

Embodiments of the invention also include a method of microbial enhanced oil recovery from an oil-bearing formation that involves utilizing microbes naturally residing in the oil-bearing formation. The method further includes treating water for introduction into the oil-bearing formation. The treatment of the water is based, at least in part, upon establishing at least one condition in the oil-bearing formation favorable to microbial activity that enhances movement of oil from the oil-bearing formation. The treated water is injected into the oil-bearing formation to establish the condition. Embodiments of the invention also include introducing oxygen into the oil-bearing formation.

Further embodiments of the invention include a system for microbial enhanced oil recovery from an oil-bearing formation. The system includes an oxygen supply apparatus for supplying oxygen to microbes in the oil-bearing formation. The system further includes a water treatment facility for treating water for introduction into the oil-bearing formation. The water treatment performed at the water treatment facility is based, at least in part, upon establishing at least one condition in the oil-bearing formation favorable to microbial activity that enhances movement of oil from the oil-bearing formation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
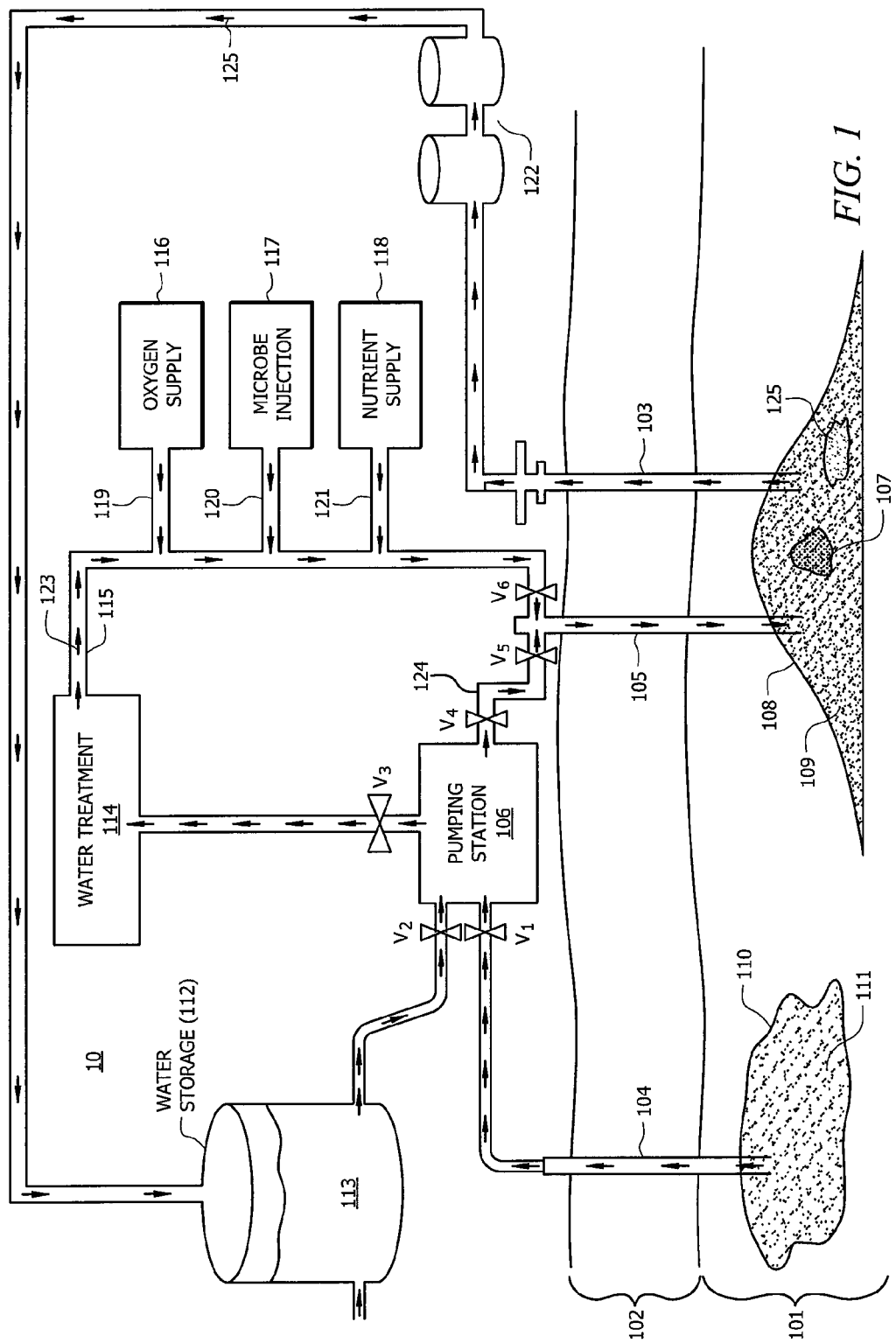
FIG. 1 shows a diagram of a system for implementing MEOR methods according to select embodiments of the invention.

FIG. 1 shows a diagram of system 10 for implementing MEOR methods according to embodiments of the invention. System 10 includes a production well 103 for recovering crude oil 109 located in oil reservoir 108. Oil reservoir 108 is situated within oil-bearing formation 101. Formation 101 may be any type of geological formation and may situated under overburden 102. Although formation 101 is shown as being onshore in FIG. 1, it should be appreciated that formation 101 may be located onshore or offshore. Injection well 105 is a well used to inject water into oil-reservoir 108. The injected water may be used for water flooding and for providing a medium for growth of microbes used in MEOR of oil 109. Produced water 125 may be the source of water used in water flooding and/or providing medium for microbial growth in oil reservoir 108. Formation water 111 naturally occurs in water reservoir 110 and may be the source of water used in water flooding and/or providing a medium for microbial growth in oil-reservoir 108. Water for system 10, however, may also be obtained from other sources such as other formations and other bodies of water such as rivers, streams, lakes, etc. Indeed, water used in the MEOR process may be purchased, for example, from a municipal authority. Water 113 from these other sources may be stored in water storage 112. Pumping station 106 may include one or more pumps. Pumping station 106 pumps water 111 from water reservoir 110 via water well 104 or from water storage 112. Embodiments of the invention make adaptations to the environment in oil reservoir 108 to facilitate microbial activity that enhances oil recovery from reservoir 108. As described further below, system 10 includes water treatment 114, oxygen supply apparatus 116, microbe injection apparatus 117 and nutrient supply apparatus 118 as components that may be used in MEOR processes to make these adaptations.

Figure 2:
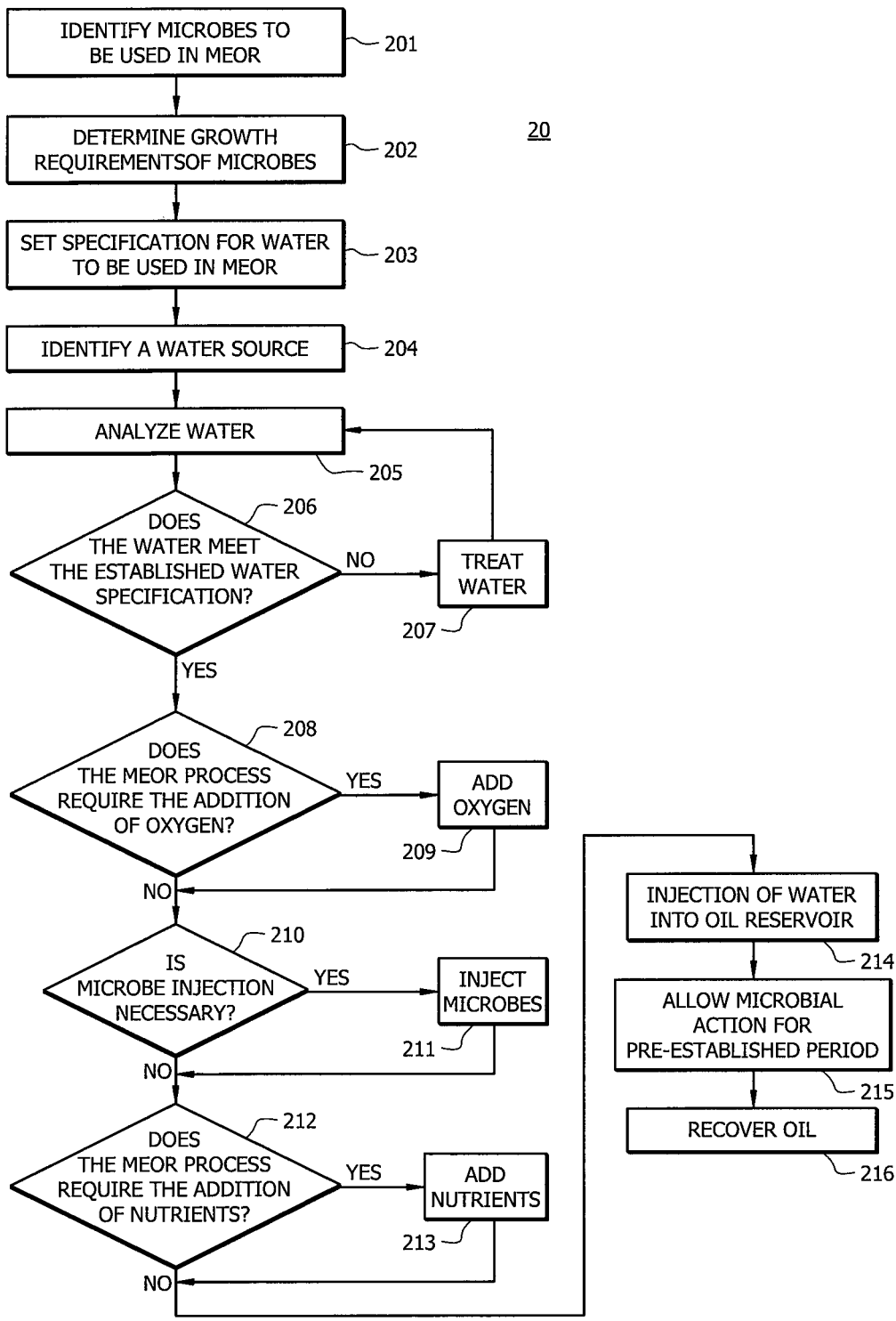
FIG. 2 shows a functional block diagram according to select embodiments of the invention.

FIG. 2 shows a functional block diagram according to select embodiments of the invention. Process 20 is a MEOR process that may be applied to, for example, an oil-bearing formation 101. Oil-bearing formation 101 includes oil reservoir 108 that has been subjected to primary or primary and secondary recovery. As is typical with most oil reservoirs, after primary or primary and secondary recovery has been applied to formation 101, a significant amount of oil 109 remains entrapped in formation 101. As such, process 20 may be applied to oil-bearing formation 101 to recover oil 109 that the primary or primary and secondary methods are unable to recover. It should be appreciated that MEOR process 20, in embodiments of the invention, would yield best results if implemented at the start of the secondary recovery. Process 20 may begin at step 201, which involves determining the microbes that are to be used in the MEOR process. In process 20, microbes 107 have been determined to be the microbes that will be used. Microbes 107 may be microbes that naturally exist in oil reservoir 108 or oil-bearing formation 101 (as used herein, native microbes of a formation are microbes that naturally exists in that formation). Alternatively, microbes 107 may not be native to oil reservoir 108 or oil-bearing formation 101 but are introduced therein in order to achieve a desired microbial activity. Indeed, microbes 107 may be a mixture of native and non-native microbes with respect to oil-bearing formation 101. Utilizing microbes as described herein includes determining what microbes exist in the oil-formation, determining whether these microbes can provide the microbial activity desired to recover oil 109 and, if the identified microbes are adequate, relying on these microbes for the desired microbial activity. Utilization of microbes also includes injecting microbes in the oil-bearing formation that are known to provide the desired microbial activity.

Microbes 107 may include one or more microbes selected from bacteria, archaea, fungi and yeast etc., or combinations thereof. In embodiments of the invention, at least some of microbes 107 may be aerobic or facultative. Further, microbes 107 may include microbes uncharacterized from natural inoculums, for example, microbes from sea water, creek water, sludge and soil. Microbes 107 may also include microbes characterized from natural inoculums, which presents a scenario where it is known that the microbes have the ability to grow with hydrocarbons as the main carbon source under reservoir-like conditions. Examples of microbes used in embodiments of the invention include microbes that degrade hydrocarbons, using oxygen, nitrates or sulphates as electron acceptors and has surfactants as a part of their membrane and/or cell wall.

Microbes 107 may also include genetically engineered/modified organisms (GMOs). These GMOs may be engineered to adapt to particular reservoir conditions or to enhance particular microbial activity for enhancing oil recovery such as the ability to degrade hydrocarbons, using oxygen, nitrates or sulphates as electron acceptors and to have surfactants as a part of their membrane and/or cell wall. It is to be noted that microbe 107 may include any combination of the different types of microbes described above.

At step 202, the environment that best facilitates population growth of microbes 107 is determined. This determination may include control experiments that monitor microbial growth as a function of changes in the environment in which microbes 107 are placed. For example, the water conditions that best facilitate microbial population growth of microbes 107 may be identified. This may involve changing the properties of water and testing what impact these changes have on microbial growth of microbes 107. The properties of water that may affect microbial growth and thus may be varied in control experiments include heavy metals content, pH, salinity, anion content, cation content, biochemical oxygen demand, total organic carbon, and precipitation properties.

Based on the determination of the water conditions that best facilitate microbial growth of microbes 107, specifications for the water that is to be used in MEOR process 20 may be set at step 203. It should be noted that though the control experiments may identify a particular range for ideal microbial growth with respect to a particular water property, that range may be varied because of other criteria. For example, higher salinity water may negatively affect microbial performance. If it is determined that for a particular microbe population the ideal salinity for water in which that population will grow is 5-10%, it should be appreciated that the specification of water to be used in the system may be set at, for example, 5-8% to satisfy some other criteria. The relationship between one water property and another water property may also guide the specifications set for the water overall. Moreover, it is not necessary that every aspect of the specification always meets the ideal conditions for microbial growth. There may be instances where the MEOR process can operate effectively though the specification of the water with respect to a particular property does not fall into the identified ideal range provided by the control experiments.

Once the specification is set for the water that will be used in the MEOR process, at step 204, a water source is identified. Typically, the source of water will be water reservoirs in the oil-bearing formation from which the oil is being extracted. As such, injection of water into an oil-bearing formation as used herein includes removing water from the oil-bearing formation, treating the water and re-injecting the water into the oil-bearing formation. For example, in system 10, water well 104, which is supplied by water reservoir 110, is a source of formation water 111 for use in the microbial enhanced oil recovery of oil 109 from oil reservoir 108. Formation water 111, however, may or may not meet the established specification set for the MEOR process. As such, formation water 111 may be analyzed at step 205. Similarly, water 113 from storage 112, which is supplied by water sources other than water reservoirs or produced waters from oil-bearing formation 101, may be analyzed at step 205.

At step 206, a determination is made whether formation water 111 or water 113 meets the specification of the water to be used in MEOR process 20 by comparing the established specifications with the results of the analysis at step 205. If the water does not meet established specifications then, at step 207, the water is treated. To treat water, pumping station 106 pumps water from water reservoir 110 via water well 104 or from water storage 112 to water treatment system 114. Valves v1 and v2 control the source from which pumping station 106 pumps. Indeed, pumping station 106 may pump from more than one source to water treatment system 114. For example, valves v1 and v2 may be opened to allow pumping station 106 to concurrently pump from water well 104 and water storage 112 to water treatment system 114.

Water treatment system 114 may have different types of equipment and systems for achieving different water properties for water used in process 20. The water properties that may be adjusted by water treatment system 114 include biochemical oxygen demand/total organic carbon, heavy metals content, pH and salinity, anion content, cation content, precipitation properties. Each of these properties and its impact on the MEOR process is discussed in turn below.

Biochemical Oxygen Demand, Total Organic Carbon, Chemical Oxygen Demand

It is important that injection water for MEOR be free of, or contain only limited amounts of, organic carbon. Biological Oxygen Demand (BOD), Total Organic Carbon (TOC) and Chemical Oxygen Demand (COD) are indicators of organic carbon/pollutants in water. That is, BOD, TOC and COD are known measures of water quality. BOD is a measure of the amount of oxygen used by aerobic organisms in water to break down organic material present in the water. TOC is the amount of organic carbon contained in organic matter in water. COD is the amount of organic compounds in water. Organic carbon in water may come from various sources including chemical treatment programs that are employed in the field to prevent or inhibit corrosion of or scale precipitation in oil recovery equipment.

Low levels of BOD, TOC and COD are important for effective MEOR for at least three reasons. First, the microbial activity in MEOR should be focused on processes involving hydrocarbons from reservoir 108 as carbon source. Second, elevated levels of BOD, TOC and COD can cause the development of rogue bacterial blooms that can consume both the injected nutrient and the injected oxygen that are intended to support the oxygen reduction processes within reservoir 108. Removal or lowering of BOD, TOC and COD allows for MEOR oxygen reduction processes to be sustained within the reservoir. Third, naturally occurring communities of microbes are present in the injected water, inside surface flowlines, pumping equipment and wellbore tubulars. Exposing these indigenous microbial communities to nutrients, oxygen and organic carbon pollution can cause the formation and growth of biofilm that can foul and plug surface equipment, flowlines and wellbore tubulars. Removal or lowering of BOD, TOC and COD can minimize the possibility of biofouling.

In some embodiments of the invention, BOD of water to be used in the MEOR process is set at 0-20 milligrams per liter. BOD, TOC and COD may be reduced by any water treatment method known in the art. For example, BOD, TOC and COD reduction may be performed by sedimentation in gravity sedimentation tanks, filtration by screens, chemical oxidation, biological processes in, for example, aerobic, facultative and anaerobic lagoons, activated sludge systems, aeration systems etc.

Figure 3:
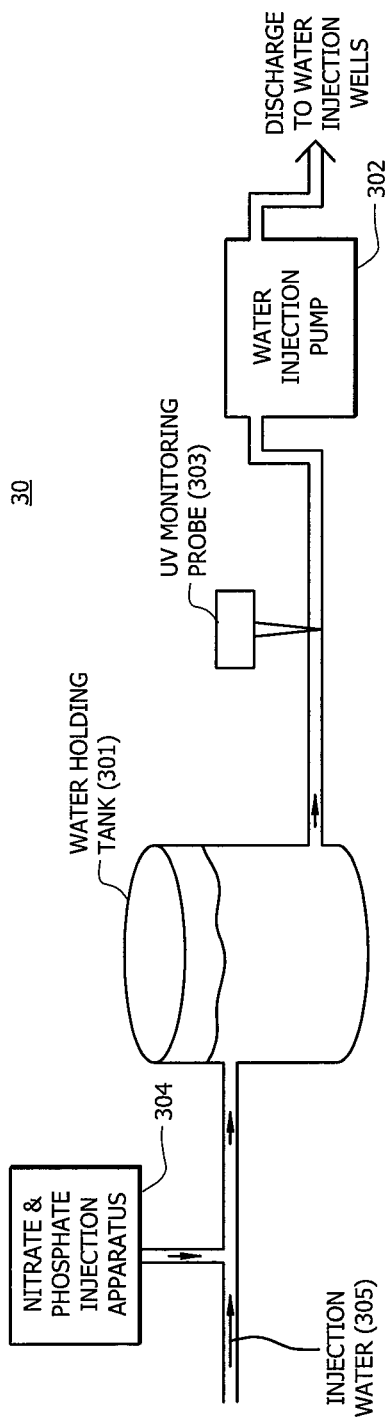
FIG. 3 shows a diagram of a system according to select embodiments of the invention.

FIG. 3 shows a specific system for eliminating or controlling organic pollutants in injection water 305, according to one embodiment of the invention. System 30 involves employing a controlled nitrogen reduction process to consume organic carbon prior to the injection of nutrient and oxygen that support the MEOR process. As such, water treatment 114 may comprise system 30 and implemented prior to injection of oxygen by oxygen supply apparatus 116, microbe injection by microbe injection apparatus 117 and nutrient injection by nutrient supply apparatus 118. System 30 includes water holding tank 301, which is typically employed upstream of water injection pump 302. Nitrate and phosphate injection apparatus 304 injects nitrate, (typically sodium nitrate) and phosphate (typically monosodium phosphate or phosphoric acid) directly upstream of holding tank 301. Alternatively, the nitrate and phosphate are pumped into holding tank 301 in sufficient quantities to support the reduction of organic content. The carbon limited denitrification process takes place within water holding tank 301 with the organic carbon being consumed in the process. The quantities of nitrate and phosphate that must be injected can be determined and controlled by monitoring the effluent water from holding tank 301 via sampling and analysis or real time with, for example, a probe such as a ultraviolet absorption probe 303 that may be deployed to measure nitrate, COD, TOC and BOD concentrations. It should be noted that in embodiments of the invention where water treatment 114 comprises system 30, then nutrient supply by nutrient supply apparatus 118 may be eliminated from system 10.

Heavy Metals

Heavy metals are metallic elements that can be toxic to biological activity. Examples of heavy metals include mercury, cadmium, lead, chromium, strontium, barium, copper, boron and arsenic. In some embodiments of the invention, it is desirable to keep the heavy metal content below 15 milligrams per liter. Heavy metals at high concentrations inhibit biological processes in microbes. As such, it is desirable to limit heavy metal content to tolerable levels in the water to be used in MEOR process 20. Water treatment system 114 may use several different methods for reducing heavy metal content. These methods include precipitation, flocculation, reduction extraction, chelation, and ion exchange, etc.

pH pH is a measure of acidity or alkalinity. The microbial activity is affected by changes in pH. In some embodiments of the invention, a preferred pH range is 5 to 9 and a more preferred range is 6 to 8.5. The pH may be altered by removing acidic or basic compounds that exist in the water being treated or by addition/formation of acids and bases.

Salinity

Salinity is the salt content of water. Different microbes may thrive in water of different salinities. Changing the salinity of water to meet the particular needs of the microbes being used may include adding salt to or removing salt from the water. Salt removal may be done by distillation and by membrane processes using reverse osmosis, etc. In some embodiments of the invention, a salinity less than 10% is preferred. In other embodiments of the invention a salinity less than 5% is preferred.

Anion Content

Anion content is a measure of the amount of anions such as nitrates, phosphates, sulfates chlorides, bicarbonates and carbonate present in the water. Anion content is related to salinity because as salinity increases, the anion content increases. Also, the anion content gives an indication of nutrients that may be available to the microbes. The anion content may be varied by addition or removal processes similar to those employed in adjusting salinity.

Cation Content

Cation content is a measure of the amount of cations such as calcium, magnesium, sodium, potassium, copper, barium, strontium and iron. Cation content also gives an indication of nutrients that may be available to the microbes. The cation content may be varied by addition or removal processes similar to those employed in adjusting salinity.

Precipitation Properties

The precipitation properties of the water indicate whether solids are likely to precipitate from the water. It is important to identify the precipitation properties of the water because if there is a high tendency for precipitation to occur in the water used in the MEOR process this can result in wells (e.g., such as injection well 105 and production well 103) becoming clogged over time. For example iron hydroxides tend to precipitate from formation water when increasing the level of oxygen in the water. When mixing different waters, barium and strontium compounds are known to precipitate from produced formation waters. Increasing pH from removal of $CO_2$ from a water may result in precipitation of calcium carbonate. The anions and cations present in the water and the pH of the water are indicators of the likelihood that precipitation problems may occur when the water is used in MEOR process. Additionally, precipitation tests may be carried out by replicating, in the laboratory, conditions that will likely exist in formation 101, during MEOR, and measuring the level of precipitation that occurs.

As noted above, embodiments of the invention may utilize various types of water treatment processes including physical, chemical and biological processes. The water treatment processes may involve the removal and/or reduction of chemical oilfield treatments that have contaminated formation water 111 in the primary and secondary recovery processes. The invention is not limited to the various water treatment methods described herein as other water treatment methods may be used. Further, in addition to the treatment processes described herein, a further treatment method may involve simply blending one batch of water having certain properties with another batch of water having different properties in order to get water meeting the established specifications. For example, if formation water 111 has a salinity of 20%, the salinity may be reduced to less than 10% by blending formation water 111 with water 113 (in this example freshwater) from water storage 112.

After water treatment at step 207, the treated water is analyzed at step 205 and another determination made at process 206 whether the established specification is met. Once the established specification is met, treated water 123 is pumped from water treatment system 114 via line 115 towards injection well 105. It should be noted that if formation water 111 and water 113 meet the established water specifications, formation water 111 and water 113 may be pumped directly from water well 104 by pumping station 106 to injection well 105 by, for example, closing valves v3 and v6 and opening valves v4 and v5.

In certain embodiments of the invention, treated water 123 may not be sufficient in providing the ideal conditions for microbial growth. For example, embodiments of the invention use aerobic microbes in the MEOR process and these microbes require oxygen for survival. Enough oxygen does not exist in oil-bearing formation 101 and thus oxygen will need to be added to oil-bearing formation 101 so that microbes 107 can survive therein. As such, at step 208 a determination may be made whether the MEOR process requires the addition of oxygen for microbes 107. It should be noted, however, that excess oxygen may negatively affect the MEOR properties of microbes 107. If it is determined that oxygen is to be added, at step 209 a pre-determined amount of oxygen is added. Oxygen may be added by various means. For example, oxygen or air may be injected into treated water 123 by oxygen supply apparatus 116 via line 119 (as shown in FIG. 1). Air introduction systems are described in U.S. Pat. No. 6,546,962 entitled "Introduction of Air into Injection Water," the disclosure of which is incorporated herein by reference. Oxygen supply apparatus may include injection pumps, ejectors, etc. In addition to or alternative to injecting air or oxygen into treated water 123, oxygen producing compounds may be injected into treated water 123 or may be injected directly into oil formation 101. Oxygen producing compounds may include $H_2O_2$, $NaClO_3$, $KClO_4$ and $NaNO_3$ and combinations thereof. In some embodiments of the invention, the oxygen content is adjusted to 0.2-15 ppm.

At step 210, a determination is made whether microbes 107 should be added to formation 101. It may be necessary to add microbes 107 to formation 101, for example, when no microbes or insufficient amount of microbes exist in formation 101. Further, a particular type of microbe may be desired in the MEOR process applied to formation 101. If microbe addition is determined to be necessary, microbes 107 are be added at step 211 by microbe injection apparatus 117 via line 120. Microbe injection apparatus may include, for example, pumps to pump microbes 107 dispersed in a liquid medium.

Apart from oxygen, microbes 107 will require nutrients to survive. The type and amount of nutrients required by microbes 107 may be known based on knowledge in the art about microbe 107. Additionally, the type and amount of nutrients required by microbes 107 may be determined by controlled growth experiments. From this information, it may be determined, at step 212, whether nutrients should be added to treated water 123. If all the required nutrients are not present in treated water 123, then nutrients are added to treated water 123 by nutrition supply apparatus 118 via line 121, at step 213. Alternatively, nutrients may be added to formation 101 by other methods apart from injection into treated water 123. Examples of nutrients according to embodiments of the invention include $NaNO_3$, $KNO_3$, $NH_4NO_3$, $Na_2HPO_4$, $K_2HPO_4$, $Ca(NO_3)_2$ and $NH_4Cl$.

It should be noted that whether oxygen and/or nutrient addition is required at steps 209 and 213 may depend on factors such as the type of microbes 107, the type of oil 109, the depth of reservoir 108, etc. Further, in embodiments of the invention that involve blending of, for example, formation water 111 and water 113, without further treatment at water treatment system 114, the blending may be done at pumping station 106. Pumping station 106 may then pump the blended water directly to oil-bearing formation 101 via water well 105. In this scenario, oxygen, microbes and nutrients may be injected into line 124 for delivery to oil-bearing formation 101 via water well 105.

At step 214, treated water 123, which may have been amended with oxygen, microbes, nutrients or combinations thereof, is injected in oil-bearing formation 101 via line 115 and injection well 105. Once treated water 123, microbes 107, oxygen and nutrients are in place in reservoir 108, at step 215, microbial action is allowed to take place and the production of incremental oil monitored in production well 103. In other words, enough time is allowed for microbes 107 to grow on residual oil (oil 109) by consuming the nutrients and the oxygen. By growing on oil 109, the microbes reduce the interfacial tension between oil 109 and water in oil-bearing formation 101 (treated water 123 and water that may otherwise exist in the formation) and reduces water relative permeability in oil-bearing formation 101. In certain embodiments of the invention, the water treatment applied at water treatment system 114 is directed to enhancing a particular one or more of microbe 107's ability to grow on oil 109 to reduce the interfacial tension between oil 109 and the water in the oil-bearing formation and reduce water relative permeability. The reduced water relative permeability will, as a consequence, divert nutrients to areas of reservoir 108 where they will stimulate the interaction of microbes 107 with the trapped oil 109 for increased production of oil 109.

After sufficient microbial activity has occurred to enhance oil recovery, the oil is recovered at step 216. The oil recovery at step 216 may involve recovery processes, that include water flooding. Water used in water flooding at step 216 may be formation water 111, water 113 or water from other sources. Crude oil 109 is recovered from oil well 103 via pipelines to separator/storage, such as at tank farm 122. At tank farm 122, production water 125 (water recovered along with oil 109) is separated from oil 109. In some embodiments, production water 125 may be transported to water storage 112 or to a separate storage. Production water may then be treated by water treatment system 114 and used in the oil recovery process as described above with respect to formation water 111 and water 113.

Although a preferred embodiment of the present invention has been described with reference to the steps of FIG. 2, it should be appreciated that operation of the present invention is not limited to the particular steps and/or the particular order of the steps illustrated in FIG. 2. Accordingly, alternative embodiments may provide functionality as described herein using various steps in a sequence different than that of FIG. 2. For example, the injection of oxygen, microbes and nutrients (steps 209, 211 and 213) may take place consecutively. Further, the injection of microbes (step 211) may occur before the injection of oxygen (step 209) or after the injection of nutrients (step 213). Any order of implementing steps 209, 211 and 213 may be used in embodiments of the invention, including implementing two or more of steps 209, 211 and 213 concurrently. Furthermore, the steps of FIG. 2 may be carried in distinct batch processes or in a continuous process or as combinations thereof. For example, a batch process may involve carrying out the injection of oxygen, microbes and nutrients (steps 209, 211 and 213) consecutively and then allowing microbial activity to take place for a certain period of time before oil 109 is recovered at step 216. On the other hand, a continuous process may involve continuously and concurrently performing the injection of oxygen, microbes and nutrients (steps 209, 211 and 213) over time and concurrently recovering oil at step 216.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of microbial enhanced oil recovery from an oil-bearing formation, said method comprising:
    creating specifications for water to be introduced into said oil-bearing formation, said specifications including a specification for biochemical oxygen demand and a specification for total organic carbon;
    injecting microbes into said oil bearing formation to enhance oil recovery;
    treating said water, outside of said oil bearing formation to meet said specifications prior to introduction into said oil-bearing formation, wherein said treating is based, at least in part, upon establishing at least one condition in said oil-bearing formation that facilitates microbial growth, of said microbes, wherein said microbial growth enhances movement of oil from said oil-bearing formation as a result of microbial surfactants, said treating including a reduction of said water's biochemical oxygen demand to meet said specification for biochemical oxygen demand and reduction of total organic carbon to meet said specification for total organic carbon;
injecting said treated water into said oil-bearing formation to establish said at least one condition; and
introducing oxygen into said oil-bearing formation for consumption by said microbes.

2. The method of claim 1 further comprising:
analyzing said water prior to said water treating.

3. The method of claim 2 wherein said analyzing comprises conducting biological growth experiments of at least some of said microbes in at least a portion of said water prior to said water treating.

4. The method of claim 1 further comprising:
conducting biological growth experiments of at least some of said microbes in at least a portion of said treated water to determine how microbial growth in said experiments is affected by changes to biochemical oxygen demand or total organic carbon.

5. The method of claim 1 further comprising:
introducing at least one nutrient into said oil-bearing formation for consumption by said microbes.

6. The method of claim 5 wherein said at least one nutrient is selected from the list consisting of: $NaNO_3$, $KNO_3$, $NH_4NO_3$, $Na_2HPO_4$, $K_2HPO_4$, $Ca(NO_3)_2$ and $NH_4Cl$.

7. The method of claim 5 wherein said at least one nutrient is introduced into said oil-bearing formation via said treated water.

8. The method of claim 5 further comprising:
determining, from biological growth experiments, that said at least one nutrient is required by said microbes.

9. The method of claim 1 wherein said oxygen is added to said injected water.

10. The method of claim 1 further comprising recovering water from a source within said oil-bearing formation.

11. The method of claim 10 wherein said treating comprises diluting said recovered water with water that does not originate from said oil-bearing formation.

12. The method of claim 1 wherein said water treating comprises the reduction of said water's heavy metal content.

13. The method of claim 1 wherein said water treating comprises adjusting any property selected from the list consisting of: pH and salinity or combinations thereof.

14. The method of claim 1 wherein said water treating comprises adjusting the concentration of at least one anion in said water.

15. The method of claim 14 wherein said at least one anion is selected from the list consisting of: nitrates, phosphates, sulfates and chlorides and combinations thereof.

16. The method of claim 1 wherein said water treating comprises adjusting the concentration of at least one cation in said water.

17. The method of claim 16 wherein said at least one cation is selected from the list consisting of: calcium, magnesium, sodium, potassium, iron and combinations thereof.

18. The method of claim 1 wherein said water treating further comprises any process selected from the list consisting of: reduction of said water's heavy metal content, adjusting said water's pH, adjusting said water's salinity, adjusting the concentration of at least one anion in said water, adjusting the concentration of at least one cation in said water and combinations thereof.

19. The method of claim 1 further comprising:
removing said oil from said oil-bearing formation.

20. The method of claim 19 wherein said removing comprises any of the following selected from the list consisting of: water flooding and thermal enhanced oil recovery.

21. The method of claim 1 further comprising:
introducing at least one nutrient into said oil bearing formation, wherein said microbes grow on residual oil in said oil-bearing formation by consuming said at least one nutrient and said oxygen, wherein said microbial growth reduces interfacial tension between said residual oil and said water and reduces said water's relative permeability.

22. The method of claim 1 wherein said microbes comprise aerobic microbes.

23. The method of claim 1 wherein said specification for biochemical oxygen demand is 0-20 milligrams per liter.

24. A method of microbial enhanced oil recovery from an oil-bearing formation, said method comprising:
injecting aerobic microbes into said oil-bearing formation;
analyzing water for introduction into said oil-bearing formation;
treating said water, outside of said oil bearing formation, based on said analysis, wherein said treating is based, at least in part, upon establishing at least one condition in said oil-bearing formation that facilitates microbial growth, of said aerobic microbes, wherein said microbial growth enhances movement of oil from said oil-bearing formation as a result of microbial surfactants, said treating including a reduction of said water's biochemical oxygen demand to a specified amount of 0-20 milligrams per liter and reduction of total organic carbon to a specified amount;
injecting said treated water into said oil-bearing formation to establish said at least one condition;
introducing oxygen into said oil-bearing formation for consumption by said aerobic microbes; and
introducing at least one nutrient into said oil-bearing formation for consumption by said aerobic microbes.

25. A method of microbial enhanced oil recovery from an oil-bearing formation, said method comprising:
introducing microbes into said oil-bearing formation;
treating water, outside of said oil bearing formation, to specifications pre-established based on experiments conducted with said microbes, for introduction into said oil-bearing formation, wherein said treating is based, at least in part, upon establishing at least one condition in said oil-bearing formation that facilitates microbial growth, of said introduced microbes, that enhances movement of oil from said oil-bearing formation, wherein said treating comprises a reduction of said water's biochemical oxygen demand to a specified amount and said water's total organic carbon to a specified amount;
injecting said treated water into said oil-bearing formation to establish said at least one condition;
introducing oxygen into said oil-bearing formation for consumption by said introduced microbes; and,
introducing at least one nutrient into said oil-bearing formation for consumption by said microbes.

26. The method of claim 25 further comprising:
analyzing said water prior to said water treating.

27. The method of claim 25 wherein said water treating further comprises any process selected from the list consisting of: the reduction of said water's heavy metal content, adjusting any said water's pH, adjusting any said water's salinity, adjusting the concentration of at least one anion in said water, adjusting the concentration of at least one cation in said water and combinations thereof.

28. The method of claim 25 further comprising:
removing said oil from said oil-bearing formation.

29. The method of claim 25 wherein said microbes comprise aerobic microbes.

30. A method of microbial enhanced oil recovery from an oil-bearing formation, said method comprising:

identifying aerobic microbes for said microbial enhanced oil recovery;

creating specifications for water to be introduced into said oil bearing formation;

analyzing said water for introduction into said oil-bearing formation;

treating said water, outside of said oil bearing formation, to meet said specifications based on said analysis, wherein said specifications are based, at least in part, upon establishing at least one condition in said oil-bearing formation that facilitates microbial growth, of said aerobic microbes, which enhances movement of oil from said oil-bearing formation;

injecting said treated water into said oil-bearing formation to establish said at least one condition;

introducing said aerobic microbes into said oil-bearing formation;

introducing oxygen into said oil-bearing formation for consumption by said introduced aerobic microbes; and introducing at least one nutrient into said oil-bearing formation for consumption by said introduced aerobic microbes.

* * * * *